United States Patent Office 3,296,228
Patented Jan. 3, 1967

3,296,228
PROCESS FOR THE PRODUCTION OF ACRYLONITRILE SYRUP
Edward Noonan Squire, Glen Mills, Pa., assignor to E. I. du Pont de Nemours and Company, Wilmington, Del., a corporation of Delaware
No Drawing. Filed July 24, 1962, Ser. No. 212,116
28 Claims. (Cl. 260—82.3)

This invention relates to the process for the production of the polymer solutions of the type disclosed in copending application Serial No. 46,083 now Patent No. 3,133,135 of Harlan Vance Ogle. More particularly, this invention relates to methods of production of polymer solutions that may be further polymerized to solid articles from polymers that are insoluble in their monomers. Specifically this invention relates to the production of polymer-in-monomer solutions of acrylonitrile, which may be further polymerized to homogeneous coherent solid articles.

Prior to the work of Ogle as disclosed in United States Patent No. 3,133,135, no effective way was known to produce polymer-in-monomer solutions of acrylonitrile, which could be polymerized to homogeneous, coherent, useful articles. And, thus, prior to the work of Ogle it was not possible to produce cast articles of large mass containing high percentages of acrylonitrile. The main difficulty encountered in any attempt to produce large cast articles from acrylonitrile was based upon the fact that acrylonitrile polymer is essentially insoluble in acrylonitrile monomer. Therefore, any attempt to produce massive cast articles from acrylonitrile invariably resulted in separation and precipitation of the polymer from the monomer. Ogle discovered that acrylonitrile may be rapidly polymerized without separation and precipitation if the acrylonitrile monomer has dissolved in it a polymer. Ogle further discovered that if acrylonitrile is copolymerized with another monomer, hereinafter sometimes called the "solubilizing monomer," the copolymer may be dissolved in acrylonitrile monomer and the polymer solution effectively polymerized to articles which are substantially all acrylonitrile units.

An object of the present invention is to provide faster and more convenient methods of producing the polymer-in-monomer solutions disclosed by Ogle.

It has been found that a very effective manner of producing polymer-in-monomer solutions of acrylonitrile can be accomplished by polymerizing the acrylonitrile monomer and at least one other comonomer in situ to the desired viscosity, and then stopping the polymerization reaction. The viscosity of the polymer-in-monomer solution may be regulated even after the polymerization is complete by the addition of additional acrylonitrile monomer, another monomer, or by the addition of another polymer-in-monomer solution of a different viscosity. In the latter case the copolymers in the polymer-in-monomer solution may be the same or different than the copolymer of the solution to which it is added.

The copolymer of the polymer-in-monomer solution produced by the in situ polymerization of the present invention will vary in acrylonitrile concentration according to the reactivity, temperature of polymerization, and the concentration of the other comonomer or comonomers. Thus, if the other comonomer is very reactive at the temperature selected for polymerization and if a very large proportion of the initial mixture of monomers is this highly reactive monomer, the composition of the copolymer in the polymer-in-monomer solution will be largely units of the second monomer. The composition of the copolymer in the polymer-in-monomer solution can be regulated very precisely by knowing the reactivity of the monomer to be polymerized with acrylonitrile, and by regulating the concentration of this monomer in the reaction mixture by periodic or continuous addition of this monomer. Since the reactivity of a particular monomer varies with the temperature, the composition of the copolymer can be varied at constant monomer concentrations by selection and regulation of temperature.

The viscosity of the polymer-in-monomer solution is largely dependent upon the molecular weight of the polymer that is dissolved in the solution. A small amount of high molecular weight polymer increases the viscosity of the solution markedly. The molecular weight of the polymer may be regulated by the use of suitable chain transfer agents. In this manner the total number of monomer units that are polymerized may be greatly increased without increasing the viscosity of the solution unduly. Specific chain transfer agents found to be effective are: lauryl mercaptan, dimercaptoacetic ester of ethylene glycol, thioglycolic acid, and ethanedithiol. They may be employed in the amounts of $5 \times 10^{-5}$ to $5 \times 10^{-2}$ equivalents of chain transfer agent per mole of monomer.

Since the desired products of this invention are polymer solutions having predetermined viscosities, comonomer concentrations, polymer concentrations, and stabilities during storage, it is necessary to control carefully the amount and kind of initiator employed, the duration and temperature of the reaction, the amount and sequence of addition of comonomer and the amount of chain transfer agent, if any, to produce the desired product. Any of the reactants may be added periodically or continuously. Because viscosity can be easily measured during the reaction, the usual procedure is to regulate the reaction conditions as calculated to give the desired product and to continue the reaction until the desired viscosity is attained.

When the desired viscosity has been attained, the polymerization reaction is stopped. This may be accomplished by cooling with external or internal cooling means such as cooling coils or by the addition of cold acrylonitrile monomer or by evaporating monomer by reducing the pressure in the reactor, or by passing cold inert gas over or into the polymer solution, or by a combination of these methods. Suitable inhibitors may be added with the cold monomer if desired. Examples of such suitable inhibitors are hydroquinone, monomethyl ether of hydroquinone, salts of ammonia, and salts of amines. If inhibitor is employed, it should be used sparingly as the presence of excess inhibitor requires more initiator when the polymer solution is polymerized to solid articles. The amount of inhibitor is preferably less than 200 parts per million parts of polymer solution. When the polymer solution is further polymerized soon after its preparation, it is possible to eliminate the cooling step or the inhibitor addition.

The polymer-in-monomer solution is preferably prepared by polymerizing at 25 to 100° C. and at pressures between 1 and 25 atmospheres; although satisfactory results are attainable at temperatures as low as −50° C. and as high as 150° C.; likewise, the pressure may be increased to as high as 100 atmospheres.

As previously pointed out, the amount of monomer other than acrylonitrile that is initially added, or that is to be continuously added to the polymerization reaction depends upon the composition that is desired. Maximum chemical resistance is achieved in the ultimate solid cast article when the amount of monomer other than acrylonitrile in the copolymer is merely sufficient to render the polymer soluble in the acrylonitrile monomer and to maintain the polymer in solution during polymerization to the finished article. The number of other monomer units in the copolymer necessary to render the copolymer soluble in the acrylonitrile monomer, of course, varies with the monomer. For example, as little as 2% by weight of 1,3-butadiene units will render an acrylonitrile copolymer soluble at a concentration of 2% in the acrylonitrile monomer and maintain the polymer in solution during polymerization to the finished article. Other diolefins, such as isoprene and 1,3-cyclohexadiene, behave in a fashion similar to butadiene. Slightly higher concentrations of styrenes are required to produce polymer soluble at the same concentration. Significantly higher concentrations of many other monomers are required to obtain copolymers with arylonitrile which are soluble at a concentration of 2% in acrylonitrile monomer. For example, about 25% by weight methylmethacrylate is required in the initial monomer mixture to produce a copolymer which is soluble in acrylonitrile monomer at a concentration of 2% and can be further polymerized to useful, homogeneous, coherent solid articles. The amount of monomer other than acrylonitrile employed is preferably within the range of 1 to 25 mole percent of the monomer mixture. In any event the amount of acrylonitrile in the polymer-in-monomer solution existing as polymerized and unpolymerized units, should be greater than 50% by weight.

When the monomer to be copolymerized with acrylonitrile normally exists as a gas, for example butadiene, any monomer that is not converted to copolymer vaporizes upon heating the polymer solution. However, when the monomer to be copolymerized with acrylonitrile exists under normal conditions of pressure and temperature as a liquid, some of this material remains in the solution as monomer. The amount of monomer other than acrylonitrile in the polymer solution is generally quite small, for in most cases the monomer is more reactive than acrylonitrile.

Obviously, there are possible uses for the polymer composition producible from the polymer-in-monomer solution of this invention which do not require maximum chemical resistance. In such instances, the concentration of the monomer or monomers other than acrylonitrile in the copolymer can be much greater than that merely necessary to render the copolymer soluble in acrylonitrile.

As before mentioned, the viscosity of the polymer-in-monomer solution is to a high degree dependent upon the molecular weight of the copolymer. It has been determined that the viscosity of the polymer-in-monomer solution should be within the range of 0.1 poise to that of a gel measured at 24° C., and that the concentration of the polymer in the polymer-in-monomer solution should be between 1.5 and 60% by weight of the solution. When the polymer solution is a gel at 24° C., this gel may be dissolved in additional acrylonitrile, and then fabricated to final articles by further polymerization, or the gel may be deformed manually and further polymerized to a solid article of the desired shape. In the latter case, it is usually desirable to employ initiators that are active under different conditions, for example two initiators, one of which is active in the presence of light and the other of which is active in the presence of heat, or two initiators that are active at different temperatures. However, it is possible to add initiator even to the gel to complete the polymerization for example by spraying a gel with tert. butyl hydroperoxide. The gel can be polymerized at or below room temperature by exposing it to an atmosphere of sulfur dioxide. Examples of initiators that are active under different conditions are:

Initiator:  Typical temperature at which initiator is active, °C.
(1) Hydroperoxides such as tert. butyl hydroperoxide plus a reducing agent such as sulfur dioxide _____ −60
(2) Benzoyl peroxide plus an amine _____ −20
(3) Trichloroacetyl peroxide _____ 10
(4) Heptafluorobutyl peroxide _____ 30
(5) Isopropylperoxydicarbonate _____ 70
(6) 2,4-dichlorobenzoyl peroxide _____ 70

Initiator—continued  Typical temperature at which initiator is active, °C.
(7) Tert. butyl peroxypivalate _____ 70
(8) Lauroyl peroxide _____ 90
(9) Acetyl peroxide _____ 100
(10) p-Chlorobenzoyl peroxide _____ 100
(11) Benzoyl peroxide _____ 110
(12) Di α-cumyl peroxide _____ 140

(1) α,α'-azodiisobutyronitrile in ultra violet light _____ −50
(2) α,α' - azobis(α,γ-dimethylvaleronitrile) in ultra violet light _____ −50
(3) Benzoin plus a dye and oxygen in visible light _____ −50

The amount of initiator employed in fabricating the final article varies widely with the particular initiator selected and the particular conditions under which the reaction is to be carried out, but in general, the amount of initiator added will be between 20 and 50,000 parts by weight per million parts of polymer-in-monomer solution, preferably between 2,500 and 20,000 parts per million.

While the process of this invention is generally applicable to the production of many of the polymer-in-monomer solutions disclosed in the Ogle Patent No. 3,133,135, it is particularly effective when employed using acrylonitrile and one or more monomers chosen from the following three classes:

(1) Diolefins of the skeletal molecular structure represented by C=C—C=C which include butadiene, isoprene, 2-fluorobutadiene, and chloroprene.

(2) Cyclic dienes of the skeletal molecular structure represented by

which include 1,3-cyclohexadiene and 2-methyl, 1,3-cyclohexadiene.

(3) Vinyl substituted aromatics of the skeletal molecular structure represented by

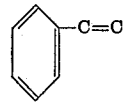

and

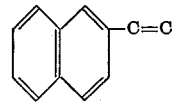

which include styrene, β-vinylnaphthalene, ortho-, meta-, and para-alkyl substituted styrenes, 2,5-halogen substituted styrenes, and alpha alkyl substituted styrenes.

Other vinyl monomers, such as acrylic acid, allyl acrylate, allyl glycidyl ether, allyl diglycol carbonate, 2-butoxylethyl methacrylate, t-butyl methacrylate, 2-ethoxy ethyl methacrylate, methacrylic anhydride, methoxyethyl methacrylate, vinyl 2-chloroethyl ether, t-butylaminoethyl methacrylate, cyclol acrylate, vinyl acetate, methyl acrylate, 1H, 1H, 3H-tetrafluoropropyl acrylate, methallyl acrylate, 2-ethylhexylmethacrylate, 1H, 1H, 7H-dodecafluoroheptyl methacrylate, lauryl acrylate, diallyl itaconate, butyl acrylate, benzyl methacrylate, i-butyl methacrylate, hydroxypropyl methacrylate, methacrolein, cyclohexyl methacrylate, hydroxyethyl methacrylate, octyl acrylate, hexyl methacrylate, vinylisobutyl ether, cyclol methacrylate, dimethyl itaconate, cyclopentyl methacrylate, vinyl salicylate, n-propyl methacrylate, allyl alcohol, acrolein, methacrolein, acrylamide, methacrylamide, vinyl 2-ethyl hexoate, vinyl acetate, vinyl stearate, diethyl fumarate, allyl chloride, 1-hexene, maleic anhydride, 2-methylvinyl pyridine, vinyl chloride, vinylidene chloride, vinyl fluoride, vinylidene fluoride, propylene, isobutylene, ethylene, butyl acrylate, methyl α-chloroacrylate, crotonic acid, methyl cinnamate, styrenesulfonic acid, diethyl maleate, itaconic acid, methyl methacrylate, etc., copolymerized with acrylonitrile. However, high concentrations (>20 mole percent) of these monomers are generally required in a two monomer system (at 77–100° C.) in order to attain polymers which are soluble in acrylonitrile. This then requires either an elimination of the excess monomer from the solution or a high dilution with acrylonitrile in order to attain a solution which contains 80 mole percent or more of acrylonitrile.

It has been found, however, that acrylonitrile polymerizes at 77–100° C. with low concentration (<20 mole percent) of these monomers to produce acrylonitrile soluble polymers providing at least one member from the preferred classes of vinyl monomers (mentioned above) is present at low concentrations (<10 mole percent) in the polymerization media.

This copolymerization to yield soluble terpolymers is important because it permits the introduction of small quantities of other monomers in the syrup polymer. These monomers have useful functional groups; e.g., the carboxylic acid functions of acrylic and methacrylic acid give cross linking and gelation via reactions with suspended barium oxide or diamines. The introduction of amine groups in the polymer by using monomers such as tert. butyl aminoethyl methacrylate permits cross linking via reaction with epoxy type groups.

Similarly, for purposes of making a resin which will adhere to or have an affinity for other materials, such as glass, wood, steel, aluminum, natural and synthetic fibers, other plastics and elastomers, other suitable groups can be introduced into the syrup polymer.

In the following examples which illustrate this invention, all parts are in parts by weight unless otherwise specified.

EXAMPLE 1

To 1000 g. of acrylonitrile monomer in a 2 liter resin kettle equipped with a stirrer, reflux condenser and a thermometer there was added 3.0 g. of $\alpha,\alpha'$-azodiisobutyronitrile. Butadiene gas was supplied to the reactor at atmospheric pressure in an amount sufficient to keep the solution saturated. The solution was heated to 55–65° C. at atmospheric pressure under ultraviolet light for 180 minutes. The reaction mixture was flushed with nitrogen to remove any residual butadiene gas and cooled to room temperature. The resulting 2.5 poises solution (measured at 24° C.) contained 13.4 wt. percent polymer which was 64.6 wt. percent acrylonitrile and 35.4% butadiene. The solution thus contained 95.3 wt. percent acrylonitrile. It was colorless and transparent.

This polymer-in-monomer solution was further polymerized by the addition of 1 g. of $\alpha,\alpha'$-azodiisobutyronitrile to 500 g. of solution. The solution was spread on a sheet of paper, placed between glass plates (0.3 lb. per sq. inch pressure) and heated under an ultraviolet light source at 45° C. for 30 minutes, and then at 75° C. for 4 hr. A firmly bonded, transparent flexible laminate having a translucent coating was formed. The coating was not visibly attacked by water, acetone, methanol, ethyl acetate, or pyridine after 30 days' exposure at room temperature.

EXAMPLE 2

The process of Example 1 was repeated. The polymer solution was cooled to 24° C. and 1 g. of $\alpha,\alpha'$-azodiisobutyronitrile was added. After 4 hours' exposure to ultraviolet light, a gel had formed. Forty grams of the gel were dissolved in 150 g. of acrylonitrile monomer. A polymer-in-monomer solution containing 99 wt. percent acrylonitrile and having a viscosity of 0.5 poise was formed.

This solution was polymerized to a cast sheet by the addition of 0.5 g. of $\alpha,\alpha'$-azodiisobutyronitrile and exposure to an ultraviolet light source. The sheet was rigid, colorless and transparent.

EXAMPLE 3

Into a 320 ml. stainless steel shaker tube there was charged at −50° C., 100 g. of acrylonitrile monomer containing 0.1 g. of $\alpha,\alpha'$-azodiisobutyronitrile and 10 g. of butadiene. The tube was capped, the temperature raised to 100° C. and held at this temperature for 50 minutes. The tube was shaken at 84 cycles per minute with a 12 inch stroke. The contents were then cooled, after expulsion of the excess butadiene, to 24° C. The product was a clear polymer-in-monomer solution having a viscosity of 3.95 poises and a polymer content of 21.3%. The polymer contained 66.0 wt. percent acrylonitrile; the syrup composition was 92.8 wt. percent acrylonitrile and 7.2 wt. percent butadiene.

EXAMPLE 4

Into a 320 ml. shaker tube there was charged at −50° C. 100 g. of acrylonitrile monomer containing 0.3 g. of dimercaptoacetic ester of ethylene glycol, 0.1 g. of $\alpha,\alpha'$-azodiisobutyronitrile and 20 g. of butadiene. The tube was sealed and shaken at 84 cycles per minute in a 12 inch stroke at 100° C. and autogenous pressure (peak pressure was 150 p.s.i.) for 40 minutes. After expulsion of excess butadiene and cooling to room temperature (24° C.), the clear, colorless polymer-in-monomer solution had a viscosity of 0.5 poise.

EXAMPLE 5

Into a 1 gallon glass kettle there was charged 2000 g. of acrylonitrile monomer, 200 g. of isoprene and 3.0 g. of $\alpha,\alpha'$-azodiisobutyronitrile. The glass kettle was capped with a pressure relief fitting and exposed to ultraviolet light for 24 hours at an ambient temperature of 23° C. Intermittent stirring of the mixture was carried on during the course of the polymerization. At the end of the 24 hour period the unreacted isoprene was removed by releasing the pressure and a clear polymer-in-monomer solution was obtained. The solution had a viscosity of 2.0 poises at 24° C. and contained 17.2% polymer. The polymer contained 57.2 wt. percent acrylonitrile; the syrup composition was 92.6 wt. percent acrylonitrile and 7.4 percent isoprene.

EXAMPLE 6

Into a 2 liter resin kettle equipped with reflux condenser, thermometer, coupling tube, nitrogen flush line and stirrer, 1275 g. of acrylonitrile, 225 g. of styrene, 5.0 g. of lauryl mercaptan, and 1 g. of $\alpha,\alpha'$-azodiisobutyronitrile were charged. The mixed ingredients were flushed with nitrogen and the solution was heated to 77° C. with stirring for 50 minutes. The colorless solution was cooled to room temperature (24° C.), had a viscosity of 2.25 poises and contained 26.5% polymer. The polymer contained 51.2 wt. percent acrylonitrile and the syrup composition was 85 wt. percent acrylonitrile and 15 wt. percent styrene.

EXAMPLE 7

The process of Example 6 was repeated using o-methyl styrene, m-methyl styrene, and p-methyl styrene. The results of these runs were substantially identical to the results of Example 6.

EXAMPLE 8

Into a 1 quart glass kettle 500 g. of acrylonitrile, 75 g. of $\alpha$-methyl styrene, 2.0 g. of dimercaptoacetic ester of ethylene glycol and 1.0 g. of $\alpha,\alpha'$-azodiisobutyronitrile were charged. The reaction mixture was then exposed to ultraviolet light for 24 hours at ambient temperature of 23° C. with intermittent stirring. After 24 hours, a colorless solution having a viscosity of 5.5 poises and containing 14.7% polymer was produced. The polymer contained 50.0 wt. percent acrylonitrile.

EXAMPLE 9

To 500 g. of acrylonitrile in a quart glass kettle there was added 22 g. of dimercaptoacetic ester of ethylene glycol and 1.0 of α,α'-azodiisobutyronitrile. To this mixture 46.2 g. of butadiene was added. After fitting the kettle with a pressure relief fitting, the solution was exposed to ultraviolet light for 36 hours at an ambient temperature of 24° C. during which time 85 g. of butadiene was added so as to maintain the concentration of unreacted butadiene essentially constant. At the end of this time the butadiene was distilled from the solution to yield a clear solution having a viscosity of 6.0 poises and containing 40.3 weight percent polymer. The dissolved polymer had an acrylonitrile content of 59.6 weight percent. The solution thus contained 83.7% acrylonitrile and 16.3% butadiene.

EXAMPLE 10

To 75 g. of acrylonitrile in a 250 ml. round bottom flask equipped with a magnetic stirrer, condenser, and gas inlet tube there was added 25 g. of methyl methacrylate and 0.2 g. of α,α'-azodiisobutyronitrile initiator. Isobutylene was run into the reaction mixture, and the solution was kept saturated with isobutylene. The slowly-stirred solution was exposed to ultraviolet light for 42 minutes at a temperature of about 45° C. The clear, colorless solution had a viscosity of about 0.1 poise. An additional 0.3 g. of the initiator was added to the stirred mixture. This portion of the reaction was carried out in a nitrogen atmosphere without additional isobutylene. The ultraviolet light intensity was increased and the temperature rose to between 75 and 80° C. The viscosity of the solution was increased to a level sufficient to use the solution to impregnate glass fabric.

181 glass fabric was impregnated with this solution and polymerized under ultraviolet light to yield a hard, tough, colorless, translucent laminate.

EXAMPLE 11

The process of Example 10 was duplicated using 14 cc. of isobutylene (liquid) instead of an amount sufficient to saturate the reaction mixture. After exposure to ultraviolet light for 116 minutes at a temperature between 25° C. and 40° C., the solution had a viscosity of 2.0 poises.

EXAMPLE 12

Into a 10-gallon stainless steel, water-steam jacketed reaction kettle equipped with an agitator, condenser, blow case, gas inlet tube, and sample port there was charged consecutively at room temperature 30 pounds of nitrogen-purged acrylonitrile, 2.4 pounds of butadiene, and 0.0048 pound of α,α'-azodiisobutyronitrile. The closed kettle was rapidly heated to 100° C. while agitating at high speed. After 40 minutes, the excess butadiene was vented off and the reaction mixture cooled to room temperature. The resulting clear colorless solution had a viscosity of 2.25 poises at 24° C. and contained 10.5% polymer.

EXAMPLES 13–58

The examples tabulated in the following table were carried out in a reactor equipped with an agitation means, under the conditions set forth. Each of these examples yielded a satisfactory polymer-in-monomer solution. In these examples the ultraviolet light source was either a Westinghouse Sun Lamp R.S. 275 watt, 110 to 125 volt A.C. only, or a Hanovia Sun Lamp 115 volt 3.9 amp., 140 watt, type 30600. The former type was used when no external heat was added, and the latter type was used when heat was added. The former lamp was spaced from 14 to 26 inches from a soft glass reaction vessel, and the latter was spaced from 6 to 10 inches from a Pyrex vessel.

| Example | Charge Composition in Grams | | | Chain Transfer Agent |
|---|---|---|---|---|
| | Acrylonitrile | αα-azo diisobutyronitrile | Other Monomer | |
| 13 | 2,500 | 3.3 | Butadiene bleed sufficient to maintain saturation | |
| 14 | 1,500 | 2.0 | ___do___ | |
| 15 | 1,000 | 3.0 | Butadiene bleed sufficient to maintain saturation, 150 vinylidine chloride. | |
| 16 | 300 | 0.6 | 15 butadiene, 30 vinyl chloride | |
| 17 | 500 | 2.0 | 41.8 butadiene, 50 vinylidene chloride | |
| 18 | 100 | 0.4 | 10 styrene | |
| 19 | 500 | 1.0 | 50 butadiene | |
| 20 | 500 | 1.0 | 27 butadiene, 50 α-methyl styrene | 2.0 dimercapto acetic ester. |
| 21 | 500 | 2.0 | 50 butadiene, 50 styrene | 5.0 ethanedithiol. |
| 22 | 80 | 0.2 | 20 butadiene, 20 vinylidine chloride | 0.1 dimercapto acetic ester. |
| 23 | 200 | 1.0 | 200 styrene, 50.1 butadiene | 5.0 lauryl mercaptan. |
| 24 | 500 | 1.0 | 15 itaconic acid, 32.5 butadiene | |
| 25 | 70 | 0.1 | 30 isobutylene | 0.3 lauryl mercaptan. |
| 26 | 500 | 1.0 | 25 vinylacetate, 35 butadiene | |
| 27 | 2,000 | 3.0 | 200 butadiene, 60 acrylic acid | |
| 28 | 500 | 1.0 | 25 acrolein, 42.2 butadiene | |
| 29 | 500 | 1.0 | 25 methyl acrylate, 27.5 butadiene | |
| 30 | 500 | 1.0 | 25 methacrylonitrile, 26 butadiene | |
| 31 | 500 | 1.0 | 25 styrene, 40 butadiene | |
| 32 | 200 | 1.0 | 50 1,3-cyclohexadiene | |
| 33 | 300 | 2.0 | 10 isoprene, 5 ethyl vinyl ether | |
| 34 | 100 | 3.0 | 300 methacrylonitrile, 30 isoprene | |
| 35 | 50 | 0.5 | 50 methacrylonitrile, 6 isoprene | |
| 36 | | 2.0 | 300 methacrylonitrile, 20 isoprene | |
| 37 | 500 | 1.0 | 39.0 vinyl chloride, 40.9 butadiene | |
| 38 | Example 37 plus equal wt. of acrylonitrile | | | |
| 39 | 100 | 0.4 | 10 acrylic acid, 12.5 butadiene | |
| 40 | 1,000 | 0.3 | 500 methyl methacrylate | 6.0 dimercaptoacetic ester of ethylene glycol |
| 41 | 1,200 | 0.3 | 225 methyl methacrylate, 75 styrene | Do. |
| 42 | 1,200 | 0.3 | 300 styrene | Do. |
| 43 | 1,000 | * | Butadiene metered in | |
| 44 | 1,380 | 1.0 | 120 styrene | |
| 45 | 1,000 | 1.0 | 20 glycidyl methacrylate-butadiene metered in | |
| 46 | 500 | 1.0 | 20 allyl glycidyl ether, 40 isoprene | |
| 47 | 500 | 1.0 | 10 t-butylaminoethyl methacrylate, butadiene metered in. | |
| 48 | 500 | 1.0 | 40 styrene, 10 methallyl acrylate | |
| 49 | 1,000 | 1.0 | Butadiene metered in; acrylonitrile and catalyst added during polymerization. | |
| 50 | 2,000 | 1.0 | 180 butadiene-2000 acrylonitrile plus catalyst is metered in | |
| 51 | 500 | 0.2 | Butadiene metered in., 500 talc | 1.0 g. dimercaptoacetic ester of ethylene glycol. |
| 52 | 100 | 0.4 | 10 styrene, 50 glass fibers | |
| 53 | 500 | 1.0 | 50 butadiene, 125 asbestos fibers | |
| 54 | 500 | 1.0 | 30 acrylic acid, 70 butadiene | |
| 55 | 100 | 1.0 | 10 EPON^R 828 2t-butylaminoethyl methacrylate | |
| 56 | 100 | 1.0 | 10 EPON^R 828 2 triethylene, tetramine | |
| 57 | 100 | 0.7 | 20 vinylidine chloride, butadiene metered in | |
| 58 | 750 | 1.0 | 750 styrene | 5.0 g. lauryl mercaptan. |

*3 g. 2,4-dichlorobenzoyl peroxide.

| Example | Polymerization Conditions ||||||| Product Characteristics |||
|---|---|---|---|---|---|---|---|---|---|
| | Heating ||| Ultra violet ||| Viscosity, 24° C. (poise) | Polymer Content (wt. percent) | Acrylonitrile in polymer (wt. percent) |
| | Time (min.) | Temp. (° C.) | Pressure (p.s.i.) | Time (hrs.) | Temp. | Pressure | | | |
| 13 | 295 | 52–59 | 14 | | On | | 3.9 | 14.1 | 73.5 |
| 14 | 294 | 51–59 | 14 | | On | | 2.3 | 10.9 | 63.2 |
| 15 | 540 | 35–46 | 14 | | On | | 2.0 | 14.4 | 54.9 |
| 16 | 2 days | 25 | 14 | | | | 8.8 | | 67.8 |
| 17 | 3 days | 25 | 14 | | | | 16.5 | 12.6 | 61.0 |
| 18 | | | | 8 days | 25 | 14 | 5.0 | 7.2 | 54.2 |
| 19 | | | | 16 | 25 | 14 | 6.27 | 12.8 | 58.3 |
| 20 | | | | 16 | 25 | 14 | 5.5 | | 50.0 |
| 21 | | | | 16 | 25 | 14 | 0.27 | | |
| 22 | 60 | 100 | 150 | | | | 0.22 | 21.0 | 48.2 |
| 23 | | | | 24 | 25 | Atm. | 20 | 54.3 | |
| 24 | | | | 8 | 25 | Atm. | 2.75 | 13.0 | 62.2 |
| 25 | 50 | 100 | Autogenous | | | | 0.01 | 6.4 | 74.6 |
| 26 | | | | 8 | 25 | Atm. | 0.22 | 9.7 | 67.1 |
| 27 | | | | 30 | 25 | Atm. | 1.70 | 11.5 | 65.4 |
| 28 | | | | 8 | 25 | Atm. | 0.5 | 13.6 | 63.2 |
| 29 | | | | 8 | 25 | Atm. | 3.0 | 17.2 | 68.2 |
| 30 | | | | 8 | 25 | Atm. | 1.3 | 16.4 | 69.3 |
| 31 | | | | 8 | 25 | Atm. | 1.75 | 13.6 | 55.7 |
| 32 | | | | 4 | 25 | Atm. | 0.05 | 6.6 | 63.7 |
| 33 | | | | 4 | 25 | Atm. | 0.1 | 4.2 | |
| 34 | | | | 16 | 25 | Atm. | 0.05 | 12.6 | 56.1 |
| 35 | | | | 16 | 25 | Atm. | 0.05 | 17.7 | |
| 36 | | | | 18 | 25 | Atm. | 0.04 | 8.1 | 57.9 |
| 37 | | | | 15 | 24 | Atm. | >200 | 24.2 | 54.2 |
| 38 | | | | | | | 4.35 | 12.1 | 54.2 |
| 39 | | | | 48 | 25 | Atm. | 1.25 | 13.0 | 54.9 |
| 40 | 180 | 79.2 | Atm. | | | | 2.75 | 22.6 | |
| 41 | 180 | 78.2 | Atm. | | | | 3.2 | 22.8 | |
| 42 | 150 | 78.5 | Atm. | | | | 4.1 | 31.1 | |
| 43 | 275 | 52–62 | Atm. | | On | | 0.25 | 8.8 | 70.5 |
| 44 | 25 | 77 | Atm. | | | | 4.1 | 9.7 | |
| 45 | 285 | 55–65 | Atm. | | On | | 2.90 | 11.2 | |
| 46 | | | | 16 | 25 | Atm. | 3.2 | 12.1 | |
| 47 | 280 | 56–65 | Atm. | | On | | 4.5 | 14.8 | |
| 48 | 27 | 78 | Atm. | | | | 4.2 | 10.2 | |
| 49 | 360 | 42–60 | Atm. | | On | | 2.85 | 20.9 | 64.1 |
| 50 | | | | 12 | 25 | Atm. | 2.25 | 10.4 | 59.9 |
| 51 | 300 | 60 | Atm. | | On | | 2.5 | 14.3 | |
| 52 | | | | 24 | 25 | Atm. | 5.0 | 7.2 | 54.2 |
| 53 | | | | 16 | 25 | Atm. | 6.27 | 12.8 | 58.3 |
| 54 | | | | 5 | 25 | Atm. | 6.2 | | 50.3 |
| 55 | 5 days | 32 | Atm. | | | | Gel. | | |
| 56 | 5 days | 32 | Atm. | | | | Gel. | | |
| 57 | 1 day | 25 | Atm. | | On | | Gel. | 39.4 | 54.2 |
| 58 | 51 min. | 73–85 | Atm. | | | | 2.65 | 32.0 | 31.8 |

One of the functions of the solubilizing monomer, whether it be a diolefin, a cyclic diene, a vinyl substituted aromatic compound, or mixtures of these, is to permit the copolymerization of other addition monomers with acrylonitrile so as to produce an acrylonitrile soluble polymer within the viscosity range of 0.1 poise to a gel. Examples 15, 16, 17, 22, 24, 26, 27, 28, 29, 30, 33, 34, 35, 36, 37, 39, 41, 45, 46, 47, 48, and 54 illustrate this principle. Thus in these examples, if the solubilizing monomer were omitted from the recipe, insoluble polymer would be produced from the reaction of acrylonitrile with vinylidene chloride, vinyl chloride, itaconic acid, vinyl acetate, acrylic acid, acrolein, methyl acrylate, methacrylate, ethyl vinyl ether, methyl methacrylate, glycidyl methacrylate, allyl glycidyl ether, t-butylaminoethyl methacrylate and methallyl acrylate.

Another means of maintaining a constant concentration of an ingredient in the acrylonitrile as it is polymerizing to a syrup is by having the acrylonitrile constantly in contact with a finely divided solid vinyl monomer. An example of this, set forth in Example 24, was carried out as follows:

Into a 1000 ml. glass kettle there was charged 500 g. of acrylonitrile, 15 g. of itaconic acid, 32.5 g. of butadiene and 1.0 g. of α,α'-azodiisobutyronitrile. The kettle was sealed with a pressure relief valve and exposed to ultraviolet light for eight hours at an ambient temperature of 25° C. During this time the contents of the kettle were mildly agitated. At the end of this time the butadiene was vented and the solution was decanted from the excess itaconic acid. (The solubility of itaconic acid in the acrylonitrile is about 0.38 g./100 g.). The clear, slightly yellow polymer-in-monomer solution had a viscosity of 2.75 poises and contained 13.0 wt. percent polymer. The polymer contained 62.2% acrylonitrile, and the solution contained 94.7 wt. percent acrylonitrile.

Yet another means of attaining a relatively constant concentration ratio between the reacting monomers is to meter in a liquid monomer. Example 49 illustrates this embodiment. Into a 2 liter resin kettle equipped with a reflux condenser, stirrer, discharge tube, gas inlet tube, dropping funnel, and thermometer, there was charged 1000 g. of acrylonitrile monomer and 1.0 g. of α,α'-azobisisobutyronitrile. The stirrer was turned on and the solution at room temperature was flushed with butadiene and then the butadiene was bled into the solution so as to maintain saturation. Steam heat was applied to the kettle, and it was irradiated by two ultraviolet lamps. The temperature was held at 42–60° C. during the entire polymerization. When the viscosity of the solution had reached about 2 poises (24° C.) the polymer-in-monomer solution was slowly withdrawn from the kettle and a solution of acrylonitrile monomer containing 1.0 g. of the azo initiator was slowly fed into the kettle so as to maintain a nearly-constant volume. During the withdrawal of the polymer-in-monomer solution and the introduction of the acrylonitrile monomer-initiator solution the viscosity was maintained in the range of 1.6 to 2.9 poises. Toward the end of the polymerization the introduction of butadiene was discontinued, the solution was flushed with nitrogen and under a slow nitrogen bleed was flushed with nitrogen and under a slow nitrogen bleed was heated to reflux for 2 minutes in order to expel residual butadiene, and then quickly cooled to room temperature. The entire operation required 360 minutes and yielded a polymer-in-monomer solution having a viscosity of 2.85 poises which contained 20.9 wt. percent polymer that analyzed 64.1 wt. percent acrylonitrile.

Thus the polymer-in-monomer solution contained 92.5 wt. percent acrylonitrile (in polymeric and monomeric form) and 7.5 wt. percent butadiene (in polymeric form).

In order to regulate molecular weight of the syrup polymer more uniformly, the chain transfer agent may be added to the polymerization mixture during the course of the reaction. Example 42 illustrates this technique. In a 2 liter resin kettle equipped with a stirrer, reflux condenser, dropping funnel, thermometer, and sampling port there was charged 1200 g. of acrylonitrile monomer, 300 g. of styrene monomer, 0.3 g. of $\alpha,\alpha'$-azobisisobutyronitrile and 3.0 g. of the dimercaptoacetic ester of ethylene glycol. The reaction mixture was flushed with nitrogen at atmosphereic pressure and 24° C. and then under a nitrogen blanket the solution was heated to reflux at 78.5° C. During the course of the polymerization 3.0 g. of dimercaptoacetic ester of ethylene glycol was slowly introduced into the reaction media. The polymerization required 150 minutes to yield a solution containing 31.1% polymer having a viscosity of 4.1 poises (at 24° C.).

Examples 25 and 27 illustrate an embodiment in which another polymer-in-monomer solution is added to the reacting mixture prior to completion of the polymerization reaction. Prior to the completion of the polymerization the excess isobutylene was vented from the Example 25 solution (this solution contained 6.4 wt. percent of an acrylonitrile/isobutylene polymer). Fifty grams of this solution was mixed with 500 g. of the Example 27 syrup. The syrups were completely miscible. Most of the syrups described in the examples are miscible one with the other.

In order to take advantage of the lower viscosity of the solution at the elevated temperature, mixing of the solution and a reinforcement and/or filler can be carried out at temperatures above room temperature. It is also beneficial in some cases to carry out the polymerization in the presence of the reinforcing and/or filler media so as to attain maximum polymerization at and on the surface of the reinforcing agent. Examples 51, 52, 53, and 54 illustrate this embodiment.

Into a 2 liter resin kettle, equipped with reflux condenser, stirrer, powder inlet tube, sampling port, and thermometer there was charged 500 g. of acrylonitrile, 1.0 g. of the dimercaptoacetic ester of ethylene glycol, and 1.0 g. of $\alpha,\alpha'$-azobisisobutyronitrile initiator. The solution was stirred, flushed with butadiene and then heated to 60° C. with a small bleed of butadiene bubbling into the reaction media. The stirred solution was irradiated with ultraviolet light at this temperature for 5 hours. The butadiene feed was stopped. The solution was flushed with nitrogen and heated to reflux for 2 minutes under a nitrogen atmosphere. It was then cooled to 60–65° C. and 500 g. of finely divided talc was added to the polymer-in-monomer solution with rapid stirring. (A sample of the solution contained 14.3 wt. percent polymer and had a viscosity of 2.5 poises at 24° C.) The talc-solution mixture was paste-like in consistency. Pastes such as this are useful in casting large objects from the acrylonitrile solutions. Similarly, carbon black, calcium carbonate, and other fillers were added to polymerizing solutions to make compositions suitable for laminating and casting.

In a like manner, 100 g. of the solution of Example 52 was mixed with 50 g. of long chopped glass fibers to provide a composition for laminating and casting into reinforced acrylonitrile polymers. And in the Example 53 solution, 500 g. was likewise mixed with 125 g. of short asbestos fibers to yield a composition suitable for making reinforced structures from acrylonitrile polymers.

I claim:

1. A process of producing a polymer-in-monomer solution of acrylonitrile having a predetermined viscosity at 24° C. of from 0.1 poise to that of a gel and a polymer concentration of 1.0 to 60% which comprises:

(a) mixing acrylonitrile monomer and at least one solubilizing monomer, the amount of solubilizing monomer in the mixture being from 1 to 25 mole percent of the mixture,
    (b) adding an amount of free radical producing initiator sufficient to polymerize the mixture to a predetermined viscosity as measured at 24° C. within the range of 0.1 poise to that of a gel,
    (c) polymerizing said mixture to form a polymer-in-monomer solution, and
    (d) stopping the polymerization reaction when the viscosity reaches the predetermined viscosity.

2. The process of producing a polymer-in-monomer solution of acrylonitrile which comprises polymerizing a mixture of acrylonitrile and at least one solubilizing monomer to a polymer-in-monomer solution having a viscosity at 24° C. greater than 0.1 poise and a polymer concentration of 1.0 to 60% by weight of the solution.

3. The process of claim 2 in which the polymerization reaction is initiated by $\alpha,\alpha'$-azodiisobutyronitrile.

4. The process of claim 2 in which chain transfer agents are employed in the polymerization reaction.

5. The process of claim 2 in which the polymerization reaction is stopped by cooling when the desired viscosity is attained.

6. The process of claim 2 in which two different solubilizing monomers are employed.

7. The process of claim 2 in which the solubilizing monomer is butadiene.

8. The process of claim 2 in which the amount of solubilizing monomer is in the range of 2 to 25 mole percent of the mixture.

9. The process of claim 2 which includes the further step of diluting the polymer-in-monomer solution produced by the polymerization reaction with additional acrylonitrile monomer.

10. The process of claim 2 which includes the further step of adjusting the viscosity of the polymer-in-monomer solution by mixing it with similar polymer-in-monomer solution having a different viscosity.

11. The process of claim 2 in which the polymerization reaction is stopped when the solution forms a gel, and in which the gel is dissolved in additional acrylonitrile.

12. The process of claim 2 in which the polymerization reaction is carried out by the use of a free radical producing initiator, and wherein the polymerization reaction is stopped at a predetermined viscosity.

13. A process for the production of stable polymer-in-monomer solutions of acrylonitrile which comprises:

(a) mixing
        (1) acrylonitrile monomer,
        (2) at least one solubilizing monomer selected from the class consisting of diolefins, cyclic dienes and vinyl substituted aromatics
        (3) a free radical producing initiator,
        (4) a chain transfer agent,
    the amount of said solubilizing monomer being 1 to 25 mole percent of the total monomer; the amount of free radical producing initiator being so selected that when the polymer-in-monomer solution reaches a predetermined viscosity greater than 0.1 poise, the amount of initiator still active is less than 60 parts per million parts of solution; the amount of chain transfer agent being within the range of $5 \times 10^{-5}$ to $5 \times 10^{-2}$ equivalents of chain transfer agent per mole of total monomer;
    (b) polymerizing mixed ingredients under a pressure of 1 to 100 atmospheres, and at a temperature of from below 0 to 150° C. to produce a polymer-in-monomer solution having a predetermined viscosity greater than 0.1 poise as measured at 24° C.;
    (c) quenching the polymerization reaction when the predetermined viscosity is attained by cooling;
    (d) stabilizing the quenched product by the addition of a polymerization inhibitor.

14. A process for the production of polymer-in-monomer solution containing greater than 50% acrylonitrile, in polymeric and monomeric form, which comprises forming a mixture of acrylonitrile and at least one solubilizing monomer selected from the group consisting of diolefins, cyclic dienes, and vinyl-substituted aromatics, and a free radical producing initiator, polymerizing said mixture to a polymer-in-monomer solution having a viscosity at 24° C. of greater than 0.1 poise and a polymer concentration of 0.1 to 60% by weight of the solution.

15. The process of claim 14 in which a monomer other than a member of said group and other than acrylonitrile is also copolymerized during said polymerizing process.

16. The process of claim 15 in which the monomers are added continuously to the mixture and in which the polymer-in-monomer solution is continuously withdrawn.

17. The process of claim 15 in which the solubilizing monomer is added periodically throughout the polymerization.

18. The process of claim 15 in which initiator is continuously added to the mixture.

19. The process of claim 15 in which initiator is periodically added to the mixture.

20. The process of claim 14 in which the initiator comprises at least one member selected from the group consisting of tert. butyl hydroperoxide, trichloroacetyl peroxide, heptafluorobutyne peroxide, isopropylperoxydicarbonate, 2,4-dichlorobenzoyl peroxide, tert. butyl peroxypivalate, lauroyl peroxide, acetyl peroxide, p-chlorobenzoyl peroxide, α,α'-azodiisobutyronitrile, benzoyl peroxide, di α-cumyl peroxide, α,α'-azosbis(α,γ-dimethylvaleronitrile).

21. The process of claim 14 in which a chain transfer agent is added to the mixture.

22. The process of claim 14 in which the polymerization reaction is stopped by cooling.

23. The process of claim 14 in which the reaction is stopped by the addition of inhibitor.

24. The process of claim 14 in which reinforcing agent is present in the mixture.

25. The process of claim 24 in which the reinforcing agent is bonded to the polymer in the polymer-in-monomer solution.

26. The process of claim 14 which includes the additional step of removing the unreacted solubilizing monomer from the polymer-in-monomer solution.

27. The process of claim 14 in which the temperature is between −50° C. and 150° C. and the pressure is between 1 and 25 atmospheres.

28. The process of claim 14 in which the solubilizing monomer is styrene.

References Cited by the Examiner

UNITED STATES PATENTS

| | | | |
|---|---|---|---|
| 2,374,841 | 5/1945 | Semon | 260—82.3 |
| 2,657,191 | 10/1953 | Coover et al. | 260—878 |
| 2,757,166 | 7/1956 | Segro et al. | 260—85.5 |
| 3,133,135 | 5/1964 | Ogle | 260—881 |

OTHER REFERENCES

"The Chemistry of Acrylonitrile" American Cyanamid Company, New York, N.Y., 1959, pages 29–33.

JOSEPH L. SCHOFER, *Primary Examiner.*

LEON J. BERCOVITZ, *Examiner.*

C. R. REAP, *Assistant Examiner.*